United States Patent
Hamzeh et al.

(10) Patent No.: US 9,551,307 B1
(45) Date of Patent: Jan. 24, 2017

(54) HINGED ENGINE COVER FOR INTAKE MANIFOLD

(71) Applicant: FORD GLOBAL TECHNOLOGIES, LLC, Dearborn, MI (US)

(72) Inventors: Mike Hamzeh, Flat Rock, MI (US); Milind B. Kulkarni, Livonia, MI (US); Christopher W. Newman, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 8 days.

(21) Appl. No.: 14/804,495

(22) Filed: Jul. 21, 2015

(51) Int. Cl.
*F02M 35/10* (2006.01)
*F02M 35/104* (2006.01)

(52) U.S. Cl.
CPC ..... *F02M 35/10354* (2013.01); *F02M 35/104* (2013.01); *F02M 35/10347* (2013.01)

(58) Field of Classification Search
None
See application file for complete search history.

(56) References Cited

U.S. PATENT DOCUMENTS

| | | | | |
|---|---|---|---|---|
| 4,222,360 A | * | 9/1980 | Fujikawa | F01P 1/02 123/195 C |
| 4,596,301 A | * | 6/1986 | Nagashima | B62K 5/027 180/215 |
| 5,491,607 A | * | 2/1996 | Bennett | G11B 25/043 360/137 |
| 6,167,855 B1 | * | 1/2001 | Mammarella | F02F 7/006 123/184.21 |
| 6,302,074 B1 | * | 10/2001 | Bolsover | F02F 7/006 123/184.21 |
| 6,321,708 B1 | * | 11/2001 | Wehner | F02M 35/10321 123/184.57 |
| 7,392,784 B2 | | 7/2008 | Yamasaki et al. | |
| 2007/0022670 A1 | * | 2/2007 | Herter | E04H 6/04 52/79.1 |

(Continued)

FOREIGN PATENT DOCUMENTS

| | | |
|---|---|---|
| JP | 2004132219 A | 4/2004 |
| JP | 2004198801 A | 7/2004 |

(Continued)

*Primary Examiner* — Mark Zimmerman
*Assistant Examiner* — Michael W Smith
(74) *Attorney, Agent, or Firm* — Gregory P. Brown; MacMillan, Sobanski & Todd, LLC

(57) ABSTRACT

An engine cover system for joining a cover with an intake manifold body. A plurality of structural ribs project from an external surface of the body including a pair of parallel ribs. Each parallel rib carries an integrally-molded U-shaped receiver strip extending transversely from the parallel ribs to form slots having closed ends proximate a first edge of the body and slot openings defined by respective edges of the receiver strips. The engine cover is comprised of a shroud, first and second radial arms, and first and second hinge pins projecting from the first and second radial arms, respectively. The hinge pins are configured to slide into the slots via the slot openings into the closed ends. First and second elastomeric ferrules are installed on the first and second hinge pins, respectively, configured to be compressed by the receiver strips when captured at the closed ends.

8 Claims, 7 Drawing Sheets

(56) References Cited

U.S. PATENT DOCUMENTS

| | | | |
|---|---|---|---|
| 2011/0100315 A1* | 5/2011 | Vichinsky | F02M 35/10321 123/184.53 |
| 2011/0253080 A1* | 10/2011 | Newman | F02M 35/10321 123/54.4 |
| 2015/0190213 A1* | 7/2015 | Wang | A61C 7/30 433/11 |
| 2016/0115918 A1* | 4/2016 | Kulkarni | F02M 35/10321 123/590 |
| 2016/0206920 A1* | 7/2016 | Gillis | A63B 21/023 |

FOREIGN PATENT DOCUMENTS

| | | | |
|---|---|---|---|
| JP | 2006183571 A | 7/2006 | |
| JP | 2006336743 A | 12/2006 | |
| WO | 2013108704 A1 | 7/2013 | |

* cited by examiner

US 9,551,307 B1

HINGED ENGINE COVER FOR INTAKE MANIFOLD

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to decorative covers installed on internal combustion engines for automotive vehicles, and, more specifically, to the mounting of an engine cover to an air intake manifold.

The engine compartment of a vehicle presents various challenges for vehicle engineers and designers in providing functionality, serviceability, and aesthetics in a relatively small space. Consideration must also be given to manufacturing and assembly costs in addition to weight, which ultimately impacts fuel economy, to deliver a competitive product. An engine cover is typically used in order to enhance the overall appearance of the engine compartment and to reduce the propagation of engine noise. Injection molded polymers are commonly used to fabricate an engine cover.

The mounting of an engine cover to an engine typically is comprised of several steel brackets, fasteners, or other joining structures such as hooks or clamps. The use of several intermediate components which attach on one side to the engine cover and on the other side to an engine component (e.g., an air intake manifold or a cam cover) creates many potential sites for NVH (noise, vibration, and harshness) problems such as squeak and rattle. A relatively large part count leads to added part costs and an associated increase in manufacturing/assembly costs.

The air intake manifold which directs incoming air to the respective engine cylinders of a combustion engine has historically been fabricated from metal. More recently, various molded materials including thermoplastics, resins, and polymers have been used to manufacture intake manifolds. Preferred materials may include nylon or other polyamides which may further include filler materials such as glass fibers. A switch to plastic materials has achieved a reduction in weight, but reliance on brackets and fasteners with a high parts count have continued.

In co-pending U.S. application Ser. No. 14/525,578, filed Oct. 28, 2014, entitled "Integrally-Molded Intake Manifold Connector for Engine Cover of Combustion Engine," which is incorporated herein by reference in its entirety, a hinged connection is disclosed wherein hinge pins extending from radial arms of the engine cover each carry an elastomeric ferrule and wherein the hinge pins are received in slots formed by transverse strips carried by structural ribs of the manifold body. A potential disadvantage of such a structure relates to manufacturing and assembly of the ferrules (e.g., O-rings) onto the hinge pins. The proper placement of the ferrules is critical for proper NVH (noise, vibration, and harshness) performance. However, the disclosed arrangement may be difficult to reliably implement with automated manufacturing techniques.

SUMMARY OF THE INVENTION

In one aspect of the invention, a combustion engine system comprises an intake manifold body comprised of molded polyamide defining a plurality of runners, an air intake passage, and parallel slotted ribs projecting from an external surface of the body oriented longitudinally and juxtaposed with a first edge of the body. Each slotted rib has a C-shaped slot with a mouth directed away from the first edge. An engine cover is comprised of a shroud section adapted to cover the intake manifold body and a hinge section adapted to join with the slotted ribs. The hinge section includes a spindle rotatably received by the slots. Elastomeric grommets are disposed over the slotted ribs and within the slots adapted to compress within the mouth to capture the spindle within the slots. The spindle and cover are rotatable with respect to the slots.

DETAILED DESCRIPTION OF PREFERRED EMBODIMENTS

Figure 1:
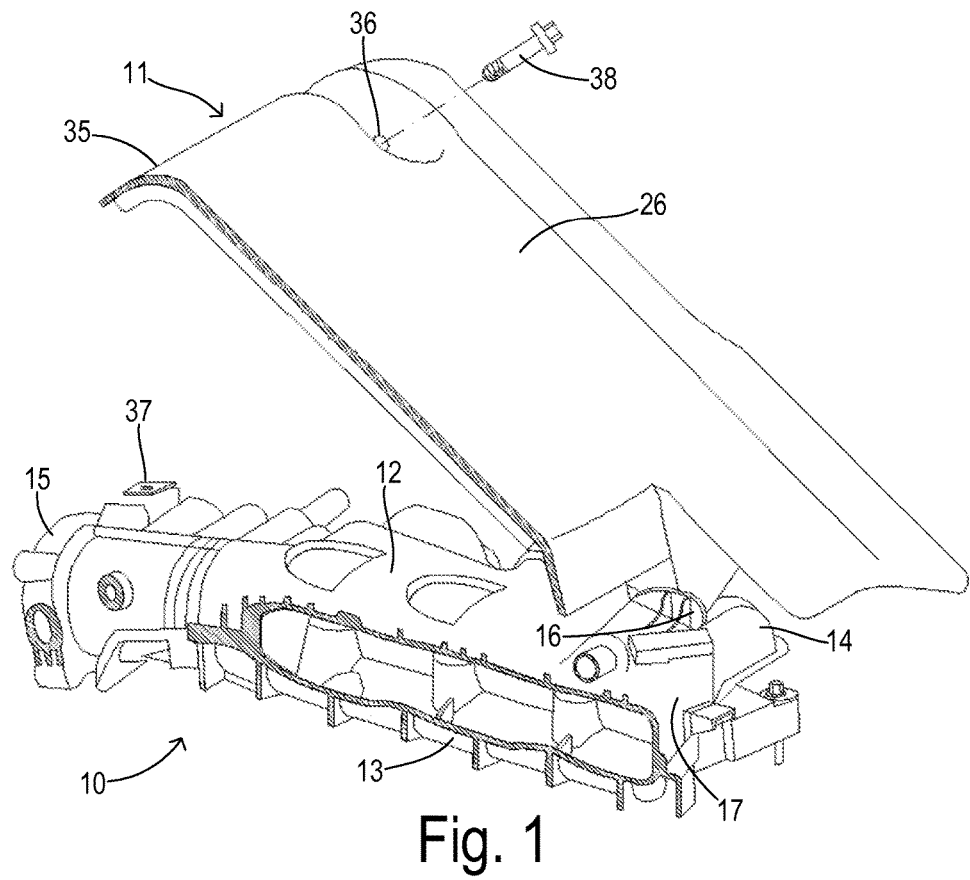
FIG. 1 is a partial cross-sectional, perspective view of an engine cover partially installed on an intake manifold body as shown in the co-pending application.

In the present invention, an internal combustion engine supports an engine cover. The cover may preferably be comprised of a molded polymeric material such as nylon, PVC, or polyurethane, for example. it may include various details for accommodating features and accessories of an engine, such as an oil port.

FIGS. 1-4 show an improved engine cover system as shown in the co-pending application. An air intake manifold 10 has integrally-molded features for attaching a cover 11 which eliminates the need for a bracket and fasteners at a corresponding attachment location. Intake manifold 10 is formed in separately molded sections including a upper manifold body 12 and a lower manifold body 13. Upper manifold body 12 is formed by injection molding a polyamide thermoplastic such as nylon, which may preferably include a filler material such as glass fiber. Body 12 defines a plurality of runners 14 and an air intake passage 15. Intake passage 15 distributes intake air between runners 14 via a plenum as known in the art.

Figure 2:
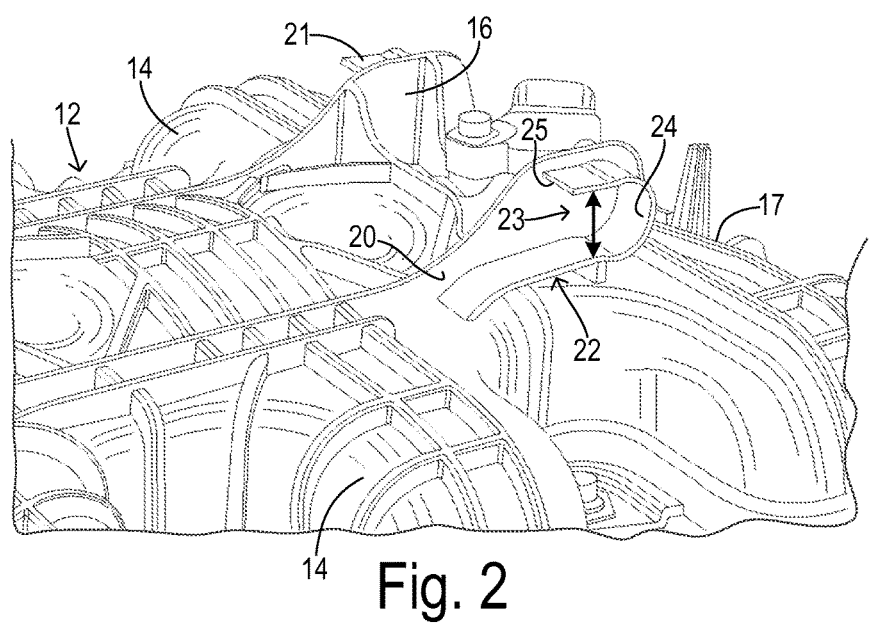
FIG. 2 is a perspective view showing ribs and receiver slots on an upper manifold body.

As shown in FIG. 2, molded body 12 may includes a plurality of structural ribs projecting outward from its outer surface. Two parallel ribs 16 and 20 are oriented longitudinally along body 12 juxtaposed in close proximity with a first edge 17 of body 12. In order to form an integrally-molded attachment structure for mounting an engine cover (thereby avoiding the need for a bracket and fasteners), parallel ribs 16 and 20 have U-shaped receiver strips 21 and 22 which extend transversely from ribs 16 and 20.

U-shaped receiver strip 22 follows a U-shaped path creating a slot 23 with a closed end 24 which is proximate to first edge 17 of body 12. An open end 25 of slot 23 receiving a hinge pin on the engine cover as described below. Preferably, slot 23 follows a profile which provides an intermediate narrowing in the slot width, resulting in an expanded pocket at closed end 24 to retain a hinge pin.

Figure 3:
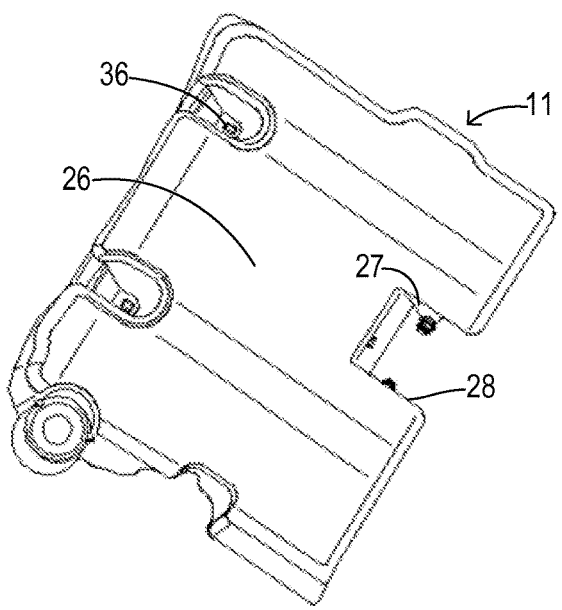
FIGS. 3 and 4 are a top view and a perspective view of the cover of FIG. 1.
Figure 4:
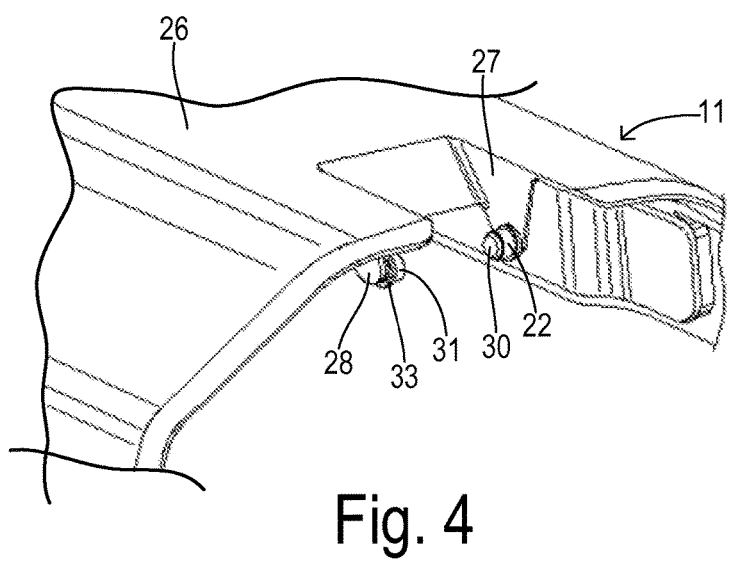
Figure 5:
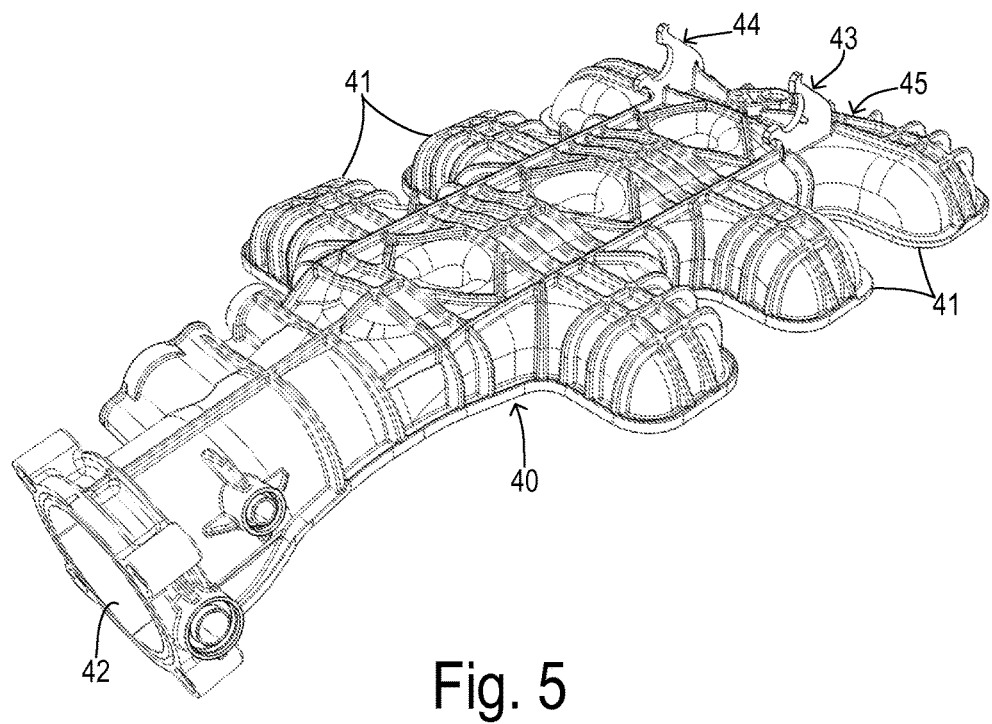
FIG. 5 is a perspective view of a portion of an intake manifold according to one preferred embodiment of the invention.
Figure 6:
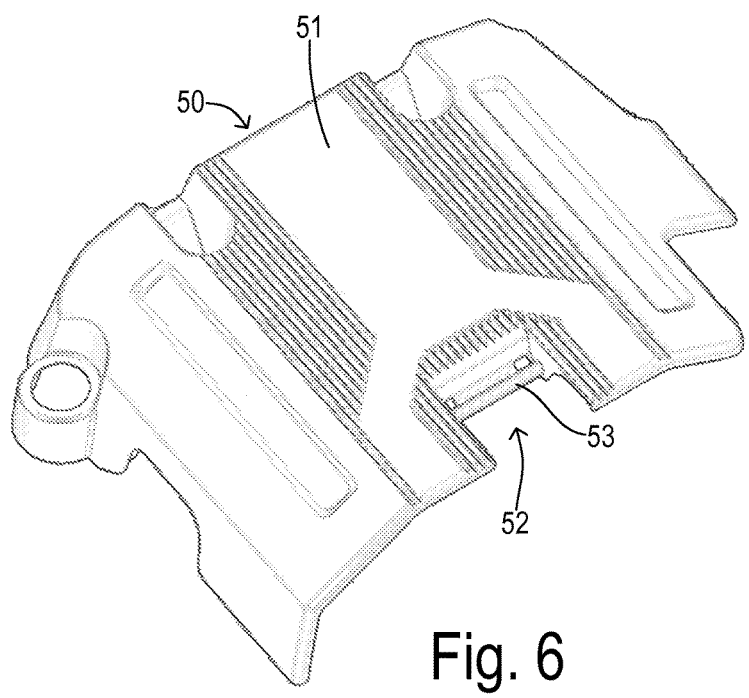
FIG. 6 is a perspective view of an engine cover for mounting to the manifold of FIG. 5.
Figure 7:
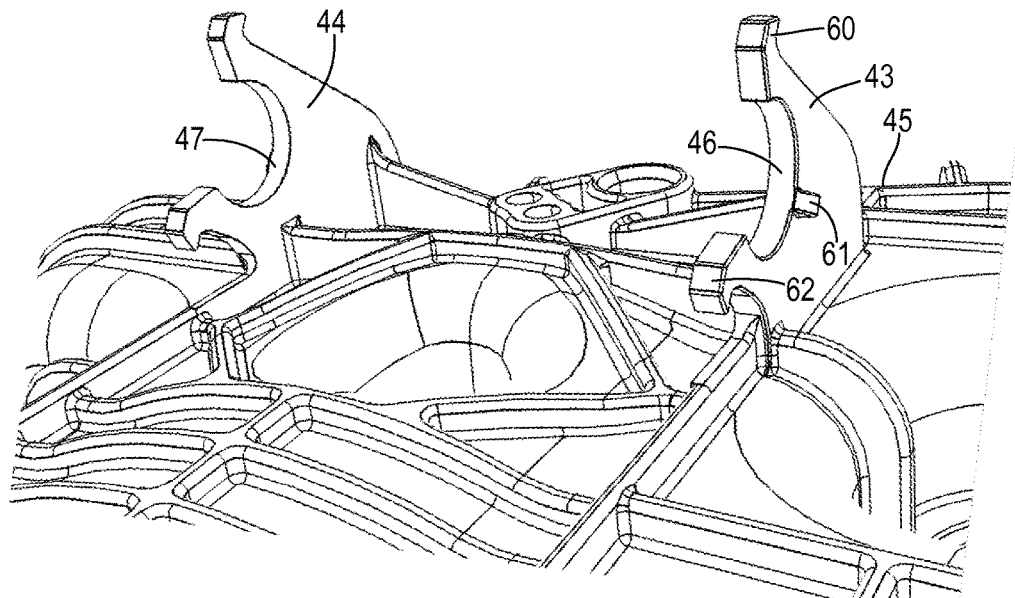
FIG. 7 is a close-up showing the C-hooks of FIG. 5 in greater detail.
Figure 8:
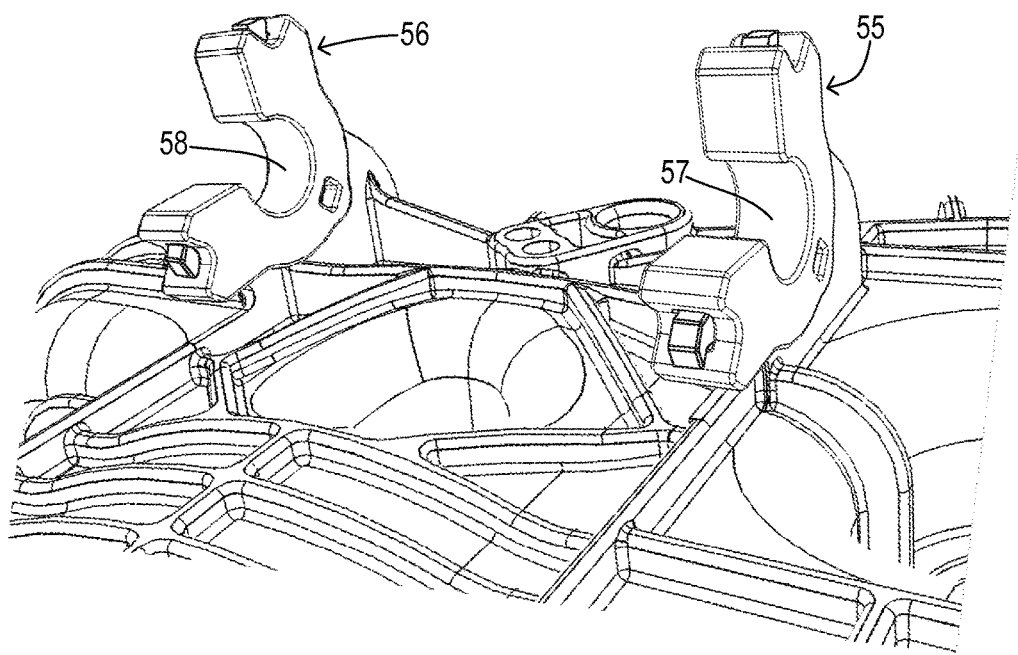
FIG. 8 shows the addition of elastomeric grommets on the C-hooks of FIG. 7.

Engine cover is shown in greater detail in FIGS. 3 and 4. Cover 11 has a shroud portion 26 to conceal at least a portion of the combustion engine including the intake manifold. A hinge portion includes first and second radial arms 27 and 28 extending from shroud 26 in order to locate first and second hinge pins 30 and 31 at a desired radial distance away from shroud 26 to provide a pivoting motion around the mutual axes of hinge pins 30 and 31. Hinge pins 30 and 31 are configured to slide into the slots defined by receiver strips 21 and 22 of intake manifold 12, respectively. In order to reduce vibrations when hinge pins 30 and 31 are received in the corresponding pockets at the closed ends of the receiver slots, they are covered by respective first and second elastomeric ferrules or grommets 32 and 33. Ferrules 32 and 33 are preferably slightly compressed by the receiver strips when captured in the pockets at the closed ends. They may preferably be comprised of a compressible rubber or other elastomeric material, formed into a generally cylindrical shape for engaging in the respective receiver strips. Ferrules 32 and 33 may be installed on hinge pins 30 and 31 by stretching, but installation may be relatively difficult to implement using automated methods.

Returning to FIG. 1, engine cover 11 is shown as it is being installed on (or removed from) intake manifold body 12, wherein the hinge pins have been inserted into the respective receiver slots to be captured in the pocket at the closed end while keeping cover 11 oriented such that it is pivoted upward from body 12 at a second (opposite) end 35. With the hinge pins captured by the corresponding receiver strips, shroud 26 may then be pivoted downward toward intake manifold body 12 such that a fastening hole 36 at second end 35 of engine cover 11 becomes aligned with a threaded receptacle 37. Receptacle 37 may be incorporated into the intake manifold or may be provided by any other conveniently located structure of the engine, so that a threaded fastener 38 may be installed by passing through fastening hole 36 to selectively attach with receptacle 37. To incorporate a threaded receptacle 37 into intake manifold body 12, an insert molding process could be used, for example.

FIGS. 5-14 illustrate an embodiment with further improvements to avoid potential disadvantages of the need to install a cylindrical ferrule over a hinge pin.

A molded polyamide intake manifold body 40 defines a plurality of runners 41 and an air intake passage 42. Outer strengthening ribs integrally formed with body 40 include a pair of parallel slotted ribs 43 and 44 projecting from an external surface of body 40 and oriented longitudinally and juxtaposed with a first edge 45 of body 40. Each slotted rib 44 and 43 provides a C-hook with a pair of arcuate fingers defining each C-shaped slot 46 and 47, respectively. Each slot has a mouth between the arcuate fingers that is directed away from edge 45.

An engine cover 15 has a shroud section 51 adapted to cover intake manifold body 40 and a hinge section 52 adapted to join with slotted ribs 43 and 44. Within hinge section 52, a spindle 53 extends transversely for being inserted into respective C-shaped slots 46 and 47.

In order to simultaneously create a snap-in retention mechanism for the spindle and provide vibrational damping, elastomeric grommets 55 and 56 are disposed over slotted ribs 43 and 44, respectively. Grommets 55 and 56 are generally C-shaped and have arcuate sections 57 and 58 for lining the interior side of C-shaped slots 46 and 47. Grommets 55 and 56 further fit within the mouth of each slot and are adapted to compress within each respective mouth when spindle 53 is passing through so that spindle 53 may be captured within slots 46 and 47. Once spindle 53 passes through each mouth into the internal recesses of each grommet 55 and 56, spindle 53 and cover 50 are rotatable with respect to the slots.

Figure 9:
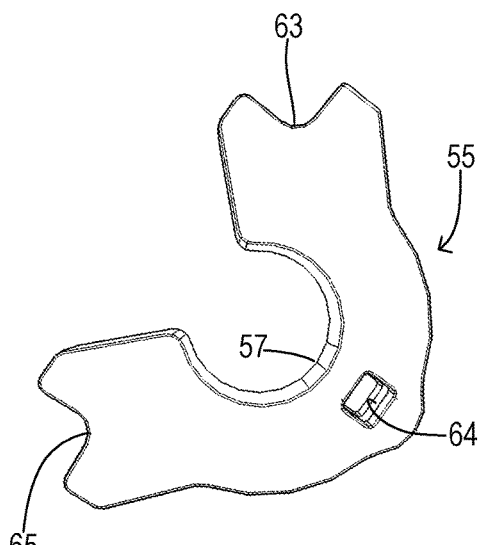
FIG. 9 is a side view of a grommet.
Figure 10:
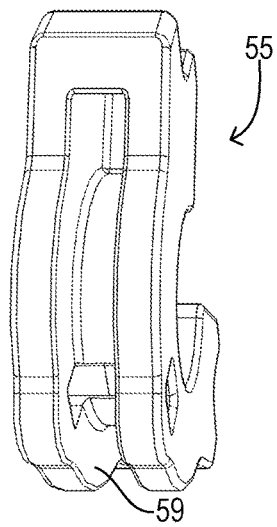
FIG. 10 is a rear view of the grommet.
Figure 11:
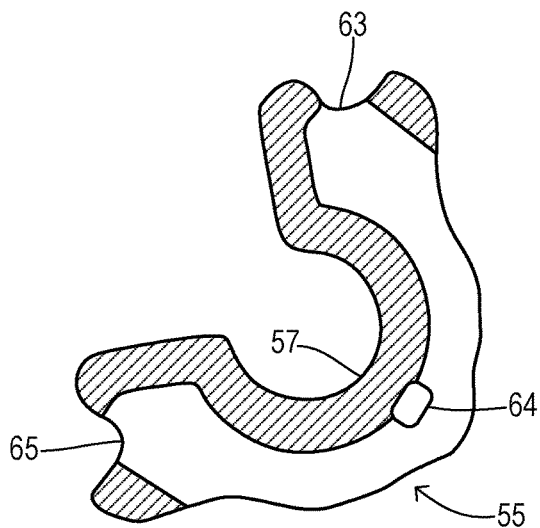
FIG. 11 is a side cross-sectional view of the grommet.

As shown in FIGS. 9-11, grommet 55 has an open groove 59 on its rear edge for receiving rib 43. Rib 43 includes hook features 60-62 for passing through respective apertures 63-65 in order to positively retain grommet 55 on rib 43. Grommets 55 and 56 may be comprised of molded rubber, for example, in order to provide flexibility to install the grommets over the ribs and over the hook features and to provide compressibility/cushioning for allowing installation and robust retention of the spindle. More specifically, each mouth of the slots in the C-hooks defines an opening having a minimum width which is greater than a corresponding diameter of the spindle. With the grommets in place, however, the added thickness from the arcuate sections lining the interior side of the C-shaped slots define an entry passage within each mouth with a reduced entry width which is less than the corresponding diameter of the spindle. Thus, the act of inserting the spindle through each mouth results in the compression the grommet within each mouth to capture the spindle within the slots.

Figure 12:
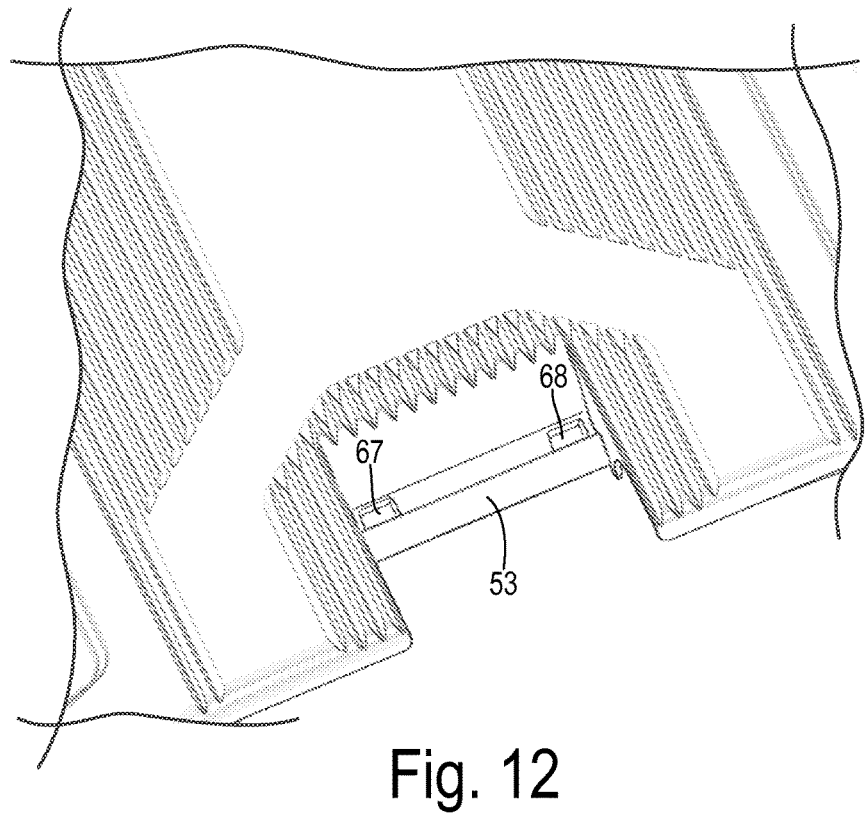
FIG. 12 is a top view of the engine cover showing the hinge section in greater detail.
Figure 13:
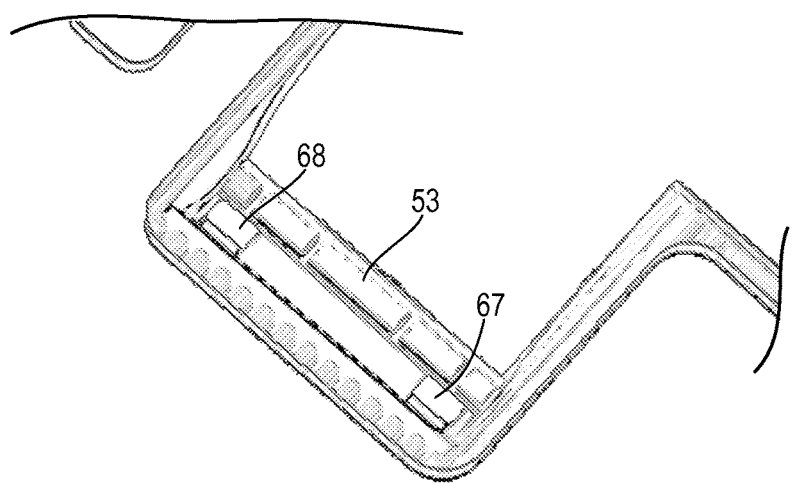
FIG. 13 is a bottom view of the engine cover showing the hinge section in greater detail.

As shown in FIGS. 12 and 13, spindle 53 may extend continuously across the hinge section. Alternatively, separate spindle sections could be formed for each slotted rib (not shown). In order to provide clearance around spindle 53 so that cover 50 can be rotated over a wide range of respective rotational positions, cover 50 preferably includes apertures 67 and 68 at an inner edge of spindle 53. Apertures 67 and 68 are configured to allow the arcuate fingers (and associated grommets) to pass through the apertures when cover 50 is rotated on spindle 53. Preferably, shroud section 51 and hinge section 52 (including spindle 53) are integrally molded.

Figure 14:
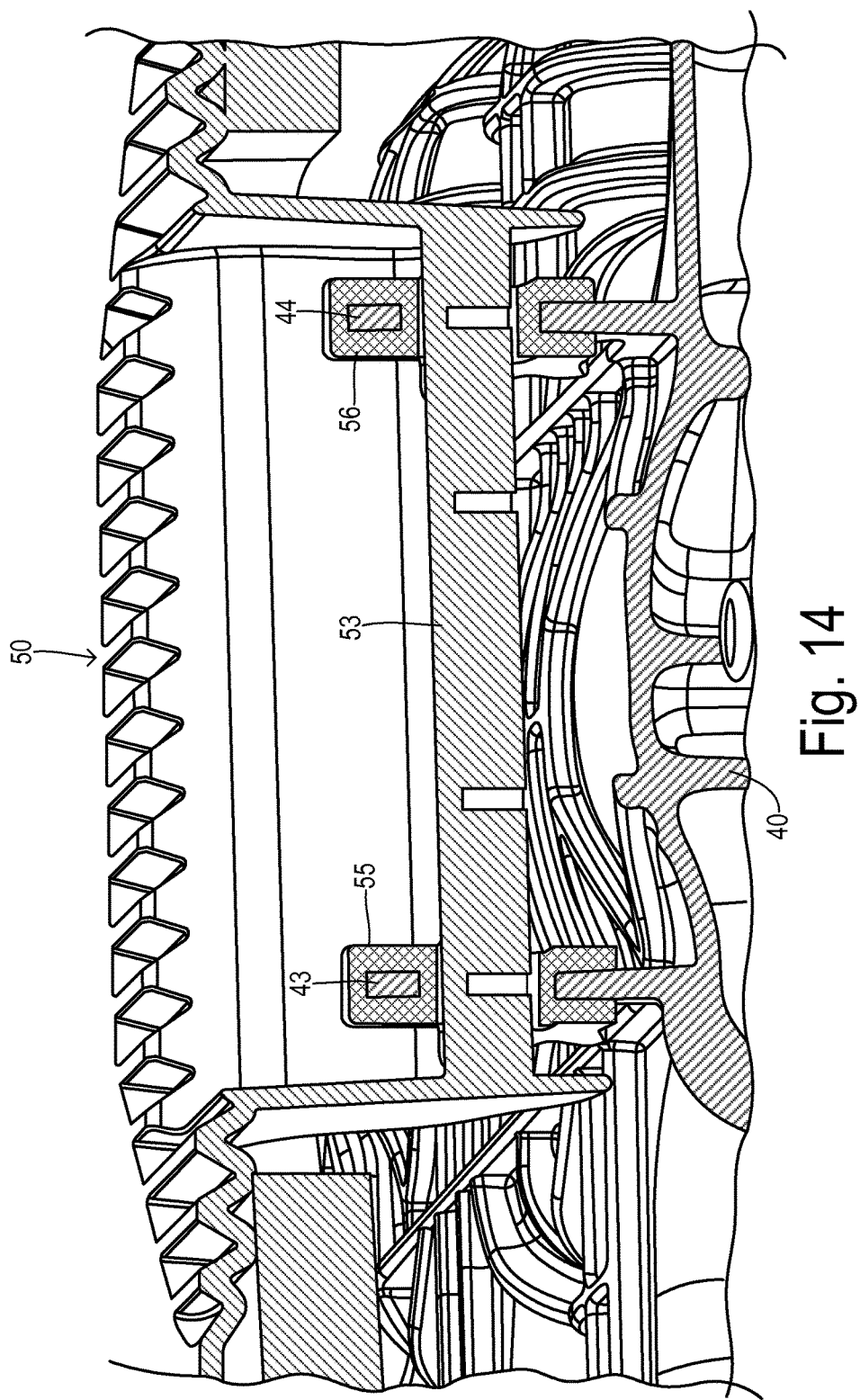
FIG. 14 is a cross-sectional view of the hinge section installed on the C-hooks.

FIG. 14 is a cross section showing spindle 53 captured within the slots in ribs 43 and 44, with grommets 55 and 56 providing retention and vibrational isolation.

What is claimed is:

1. A combustion engine system comprising:
   an intake manifold body comprised of molded polyamide defining a plurality of runners, an air intake passage, and parallel slotted ribs projecting from an external surface of the body oriented longitudinally and juxtaposed with a first edge of the body, wherein each slotted rib has a C-shaped slot with a mouth directed away from the first edge;
   an engine cover comprised of a shroud section adapted to cover the intake manifold body and a hinge section adapted to join with the slotted ribs, wherein the hinge section includes a spindle rotatably received by the slots; and elastomeric grommets disposed over the slotted ribs and within the slots adapted to compress within the mouth to capture the spindle within the slots, and wherein the spindle and cover are rotatable with respect to the slots.

2. The system of claim 1 wherein the shroud section and hinge section are integrally molded.

3. The system of claim 1 wherein each slotted rib includes a pair of arcuate fingers, and wherein each grommet includes an arcuate groove receiving the arcuate fingers.

4. The system of claim 3 wherein the hinge section defines openings adjacent the spindle for receiving the arcuate fingers at respective rotational positions of the spindle within the slots.

5. The system of claim 1 wherein the grommets are comprised of rubber.

6. The system of claim 1 wherein the shroud section includes a fastening hole, and wherein the system further comprises:
- a releasable fastener passing through the fastening hole to selectably attach the shroud section with the intake manifold body when the cover is rotated to an assembled position.

7. The system of claim 1 wherein each mouth defines an opening width greater than a corresponding diameter of the spindle, and wherein the grommets define an entry passage within each mouth defining an entry width less than the corresponding diameter of the spindle.

8. A method for attaching a cover over an engine, comprising:
- integrally molding an intake manifold upper body having a plurality of runners, an air intake passage, strengthening ribs, and parallel slotted ribs projecting from an external surface of the body oriented longitudinally and juxtaposed with a first edge of the body, wherein each slotted rib has a C-shaped slot with a mouth directed away from the first edge;
- integrally molding an engine cover having a shroud section adapted to cover the intake manifold body and a hinge section adapted to join with the slotted ribs, wherein the hinge section includes a spindle rotatably received by the slots;
- placing elastomeric grommets over the slotted ribs and within the slots;
- inserting the spindle through each mouth to compress the grommet within each mouth to capture the spindle within the slots;
- pivoting the engine cover into abutment with the body; and
- attaching a releasable fastener to the engine cover and the body.

\* \* \* \* \*